Sept. 25, 1962

P. C. HUTTON 3,055,687

FLEXIBLE MOUNTINGS FOR STRUCTURAL MEMBERS

Filed March 28, 1960

INVENTOR
PHILIP C. HUTTON

BY

ATTORNEYS

Sept. 25, 1962 P. C. HUTTON 3,055,687
FLEXIBLE MOUNTINGS FOR STRUCTURAL MEMBERS
Filed March 28, 1960 5 Sheets-Sheet 2

INVENTOR
PHILIP C. HUTTON

BY
ATTORNEYS

Sept. 25, 1962 P. C. HUTTON 3,055,687
FLEXIBLE MOUNTINGS FOR STRUCTURAL MEMBERS
Filed March 28, 1960 5 Sheets-Sheet 3

INVENTOR
PHILIP C. HUTTON

BY

ATTORNEYS

Sept. 25, 1962 P. C. HUTTON 3,055,687
FLEXIBLE MOUNTINGS FOR STRUCTURAL MEMBERS
Filed March 28, 1960 5 Sheets-Sheet 4

INVENTOR
PHILIP C. HUTTON

BY
ATTORNEYS

Sept. 25, 1962　　　　P. C. HUTTON　　　　3,055,687
FLEXIBLE MOUNTINGS FOR STRUCTURAL MEMBERS
Filed March 28, 1960　　　　　　　　　　5 Sheets-Sheet 5

INVENTOR
PHILIP C. HUTTON

BY

ATTORNEYS

United States Patent Office 3,055,687
Patented Sept. 25, 1962

3,055,687
FLEXIBLE MOUNTINGS FOR STRUCTURAL
MEMBERS
Philip Charles Hutton, Manor Royal, Crawley, England,
assignor to Silentbloc Limited, Crawley, England, a
company of Great Britain
Filed Mar. 28, 1960, Ser. No. 18,036
Claims priority, application Great Britain Apr. 6, 1959
6 Claims. (Cl. 287—85)

This invention relates to flexible mountings of the kind comprising two rigid members for attachment to the parts which are to be connected by the mounting, and resilient connecting means disposed in the space between the two rigid members and serving to connect them to one another.

The invention is particularly but not exclusively applicable to flexible mountings of the above kind comprising a rigid tubular outer member having an approximately cylindrical bore, a rigid inner member having an approximately cylindrical external surface lying within and approximately concentric with the bore of the outer member and having an external diameter substantially less than the diameter of the bore of the outer member, and at least one annular member of rubber or like flexible resilient material (hereinafter for convenience called rubber) lying in the annular space between and adhering to the inner and outer members so as to support one of them from the other.

An object of the invention is to provide a flexible mounting of the above kind in which the resilient connecting means will be such as to be capable of resisting substantial compresive loads while permitting a substantial degree of relative displacement between the two rigid members in a direction parallel to the adjacent surfaces of such members. Thus, in the case of a flexible mounting comprising a rigid tubular outer member and an externally cylindrical inner member as above referred to, it is an object of the invention to provide a construction which will provide substantial resistance to relative radial displacement of the inner and outer members while permitting a substantial degree of relative axial movement between the inner and outer members with comparatively small effort.

In a flexible mounting of the kind referred to according to the present invention the resilient connecting means comprises end or edge portions formed of rubber or like flexible resilient material each extending between and adhering firmly to the rigid members and intermediate parts which extend between such end or edge parts, adhere respectively to the rigid members and are substantially free to slide over one another. In some cases a lubricant may be provided for the surfaces which thus slide relatively to one another, and in this case the lubricant may be in the form of a lubricating substance or in the form of a lubricated layer or a layer of self-lubricating material.

Thus, where a flexible mounting according to the invention is of the kind comprising a rigid outer tubular member with a cylindrical bore and a rigid inner member having a generally cylindrical external surface lying within and approximately coaxially with the bore, the resilient connecting means, which are thus disposed in the annular space between the inner and outer members, comprise two axially spaced annular end parts formed of rubber or like flexible resilient material each extending between and adhering firmly to the inner and outer members, and two concentric intermediate approximately cylindrical parts arranged approximately coaxially with one another and disposed in the space between such end parts and adhering respectively to the inner and outer members while lying in contact with one another or with a sleeve interposed between them and being substantially free to move axially relatively to one another.

In a preferred arrangement the intermediate parts are formed of rubber and when so formed may be formed integral with the end parts. Moreover in this case either both intermediate parts may be formed integral with both end parts or one of the intermediate parts may be formed integral with one of the end parts while the other intermediate part is formed integral with the other end part.

In such a construction where the rigid members comprise inner and outer concentric cylindrical parts, both intermediate parts may be formed integral with both end parts while a sleeve of lubricating or self-lubricating material is provided between the adjacent surfaces of the intermediate parts, this sleeve being in the form of a cylinder of lubricating or self-lubricating material totally enclosed, as by moulding, within the unit constituted by the end parts and the intermediate parts. Such an arrangement may in some cases be used to facilitate manufacture since the cylinder referred to can provide the required "core" member separating the two intermediate parts during the manufacture of the unit.

In any case where the rigid members are in the form of concentric cylindrical parts the end parts of the resilient connecting means may be connected to the inner and outer members by bonding or cementing without any substantial radial compression, but these end parts are preferably in a state of substantial radial compression and in this case may if desired have their adhesion to the rigid members increased by bonding or cementing to one or each of such members.

Where, as will usually be preferred, the intermediate parts are also formed of rubber, these parts may be arranged to be substantially uncompressed in use or may be arranged to be compressed but to a substantially lower degree than the end parts.

A number of constructions according to the invention are shown by way of example in the accompanying drawings in which:

FIGURE 17 is a side elevation partly in cross section of the construction shown in FIGURE 16, while

In each of the constructions shown respectively in FIGURES 1, 4, 6, 8, 10, 12 and 14 the mounting comprises a rigid metal tubular inner member 1 of cylindrical internal and external form and a rigid metal tubular outer member 2 of cylindrical form surrounding and spaced from the inner member 1, and resilient connecting means disposed in the annular space between the inner and outer members 1 and 2.

Figure 1:
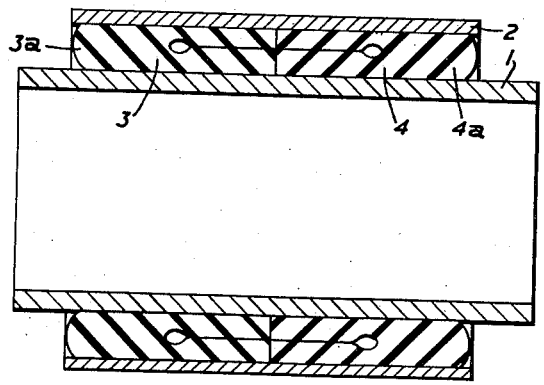
FIGURE 1 is a cross section of one construction in a plane containing the axis of the mounting.
Figure 2:
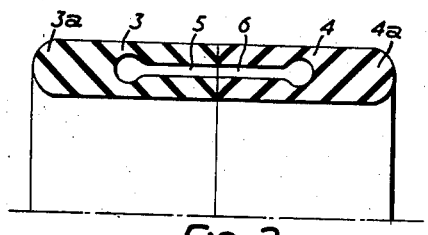
FIGURE 2 is a cross section in a similar plane to FIGURE 1 showing the form of the rubber elements incorporated in FIGURE 1 before they are assembled between the inner and outer members.

In the construction shown in FIGURES 1 and 2 the resilient connecting means comprise a tubular rubber bushing formed in two parts 3 and 4 which, before assembly between the inner and outer members 1 and 2 have the cross sectional form shown in FIGURE 2 and when assembled between the parts 1 and 2 have the cross section indicated in FIGURE 1. It will thus be apparent that in the assembled mountings the end parts 3a and 4a of the bushing, 3, 4 are radially compressed to a substantial degree while the intermediate parts where the annular slots 5 and 6 are formed are comparatively lightly radially compressed and can slide axially over one another. To assist such sliding movement a lubricating substance may be inserted into the annular slots 5 and 6 before assembly of the bushing 3, 4 between the members 1 and 2.

In the construction shown in FIGURES 1 and 2 the members 1 and 2 may be regarded as being of circular cross section.

Figure 3:
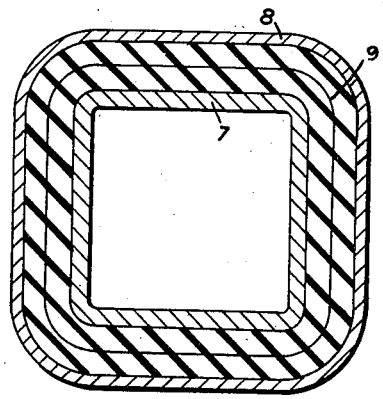
FIGURE 3 is a cross section in a plane normal to the axis of the joint of a modification of the construction shown in FIGURE 1.

In the modification shown in FIGURE 3 the form of the mounting is similar to that shown in FIGURE 1 except that the inner and outer members and the rubber bushing are of approximately square cross section as shown respectively at 7, 8 and 9.

Figure 5:
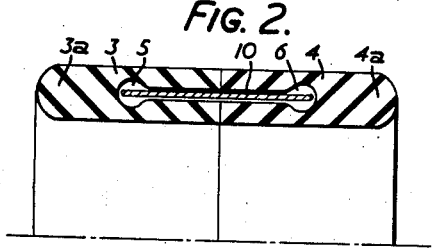
FIGURE 5 is a similar view to FIGURE 2 of the rubber elements and associated parts used in the construction shown in FIGURE 4.
Figure 4:
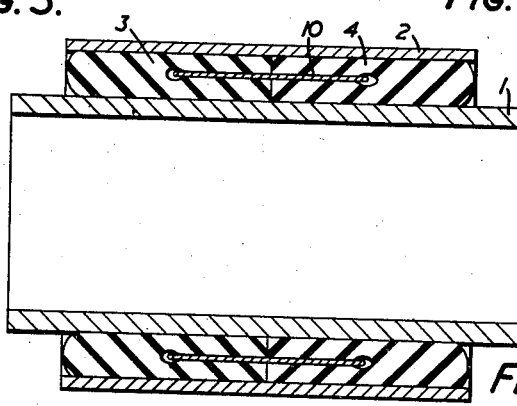
FIGURE 4 is a similar view to FIGURE 1 of an alternative construction according to the invention.

In the construction shown in FIGURES 4 and 5 the resilient connecting means comprise a rubber bushing having two parts 3 and 4 similar to the parts 3 and 4 in FIGURES 1 and 2 but, in addition, there is disposed in the annular slots 5, 6 a cylindrical layer 10 either of metal or of self lubricating material. When the layer 10 is of metal a lubricating substance may also be provided in the slots 5, 6.

Figure 6:
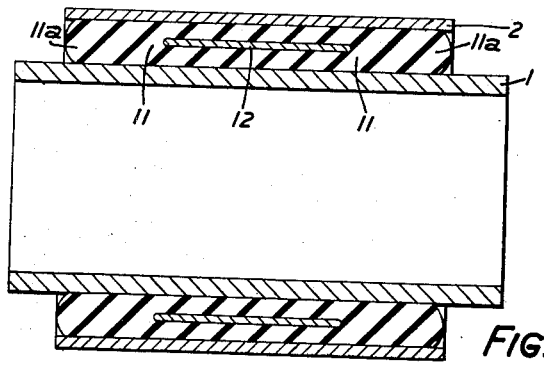
FIGURE 6 is a similar view to FIGURE 1 of a further construction according to the invention.
Figure 7:
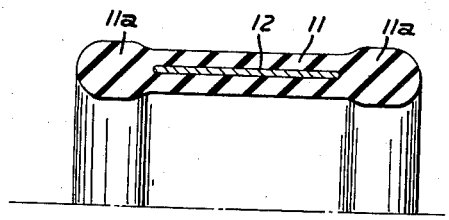
FIGURE 7 is a similar view to FIGURE 2 of the rubber element used in the construction shown in FIGURE 6.

In the construction shown in FIGURES 6 and 7 the resilient connecting means comprise a rubber bushing 11 formed in one piece and, before assembly between the members 1 and 2, having the cross sectional form indicated in FIGURE 7, this rubber bushing having embedded in it during the moulding process a cylindrical sleeve 12. As will be seen the end portions 11a of the rubber bushing 11 have before assembly greater radial thickness than the intermediate part of the bushing so that these end portions in the assembled mounting are more highly radially compressed than the part of the bushing adjacent to the sleeve 12. The sleeve 12 might be formed of a self-lubricating material or of metal and in the latter case may have a lubricant associated with it to facilitate the sliding of the intermediate parts of the bushing 11 on the surface of the sleeve.

Figure 8:
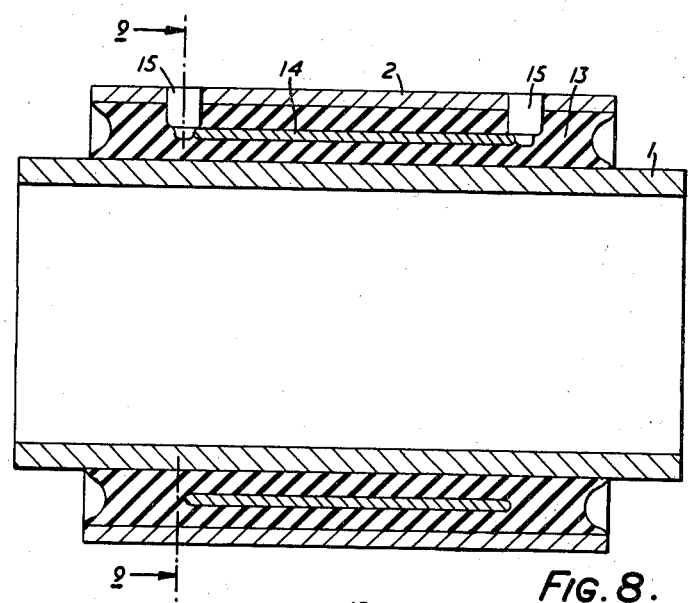
FIGURE 8 is a similar view to FIGURE 1 of an alternative construction of mounting according to the invention.
Figure 9:
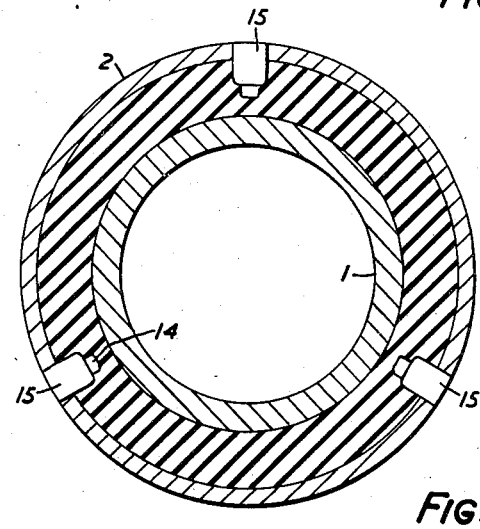
FIGURE 9 is a cross section of the mounting shown in FIGURE 8 on the line 9—9 of FIGURE 8.

In the modified construction shown in FIGURES 8 and 9 the resilient connecting means are in the form of a rubber bushing 13 bonded during the moulding process to the inner and outer members 1 and 2 and having moulded therein a sleeve 14 of metal. During the moulding operation the sleeve 14 would be held in place by pins projecting from the outer member 2 and, these pins when removed, thus leave holes as indicated at 15. If desired after moulding a lubricating substance may be injected through the holes 15 between the sleeve 14 and the adjacent surfaces of the rubber.

Figure 10:
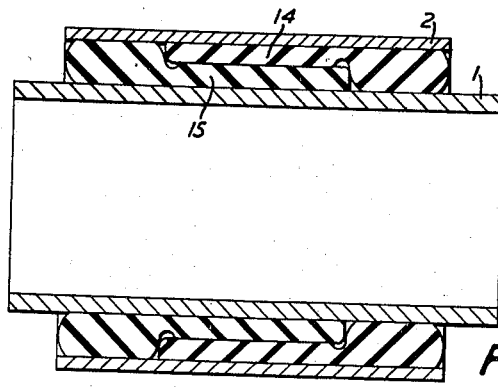
FIGURE 10 is a similar view to FIGURE 1 of a further construction according to the invention.
Figure 11:
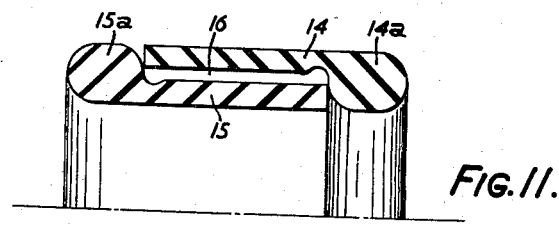
FIGURE 11 is a similar view to FIGURE 2 of the rubber elements used in the construction shown in FIGURE 10.

In the construction shown in FIGURES 10 and 11 the resilient connecting means comprises two rubber bushings 14 and 15 constructed and arranged as shown so as partly to encircle one another and, in their unassembled state, having a space 16 between their overlapping parts.

It will be apparent that in the assembled mounting the end portions 14a and 15a of the bushings 14 and 15 will be radially compressed to a substantial degree while the intermediate portions will be radially compressed to a lesser degree. It this construction a lubricant may be inserted into the space 16 before assembly so as to facilitate the sliding of the adjacent surfaces of the overlapping parts of the bushings 14 and 15 over one another.

Figure 12:
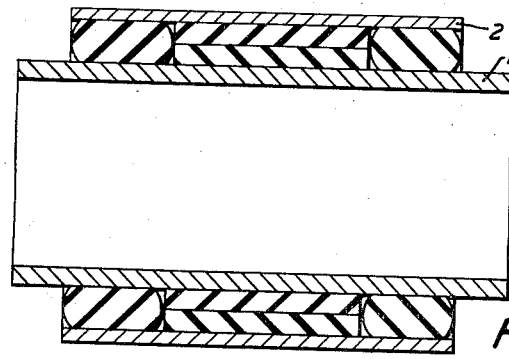
FIGURE 12 is a similar view to FIGURE 1 of a further construction according to the invention.
Figure 13:
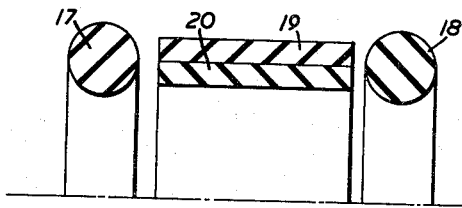
FIGURE 13 is a similar view to FIGURE 2 of the rubber elements used in the construction shown in FIGURE 12.

In the construction shown in FIGURES 12 and 13 the resilient connecting means comprise four annular rubber elements 17, 18, 19 and 20. The elements 17 and 18 when in their unassembled state are in the form of rings of circular cross section as shown in FIGURE 13 while 19 and 20 are in the form of concentric cylinders. In the assembled mounting the rings 17 and 18 are substantially radially compressed and distorted while the cylinders 19 and 20 are only comparatively slightly radially compressed. A lubricating substance may be provided between the adjacent surfaces of the cylinders 19 and 20.

Figure 14:
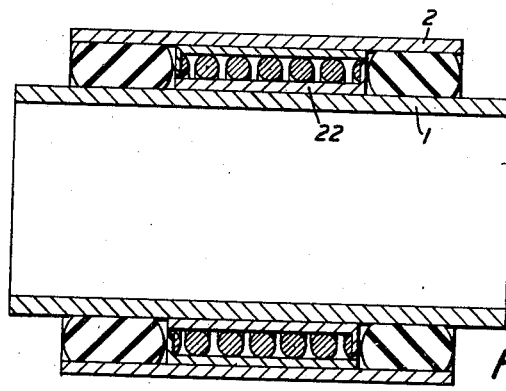
FIGURE 14 is a similar view to FIGURE 1 of a still further construction according to the invention.
Figure 15:
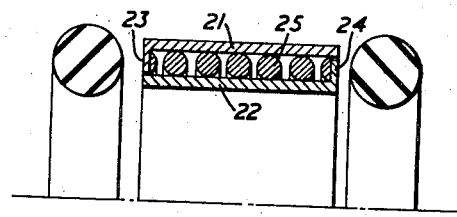
FIGURE 15 is a similar view to FIGURE 2 of the intermediate elements used in the construction shown in FIGURE 14.

In the construction shown in FIGURES 14 and 15 the arrangement is generally similar to that shown in FIGURES 12 and 13 except that, instead of the rubber cylindrical members 19 and 20, the intermediate part of the resilient connecting means comprises two concentric metal sleeves 21, 22 having flanges 23, 24 at their ends against which bear the opposite ends of a compression spring 25 lying in the annular space between the sleeves 21 and 22. In the assembled joint the part 21 is held stationary relatively to the outer part 2, e.g. by friction, while the part 22 is held stationary with respect to the part 1 so that the spring 25 acts to resist relative axial movement between the inner and outer members 1 and 2.

Figure 16:
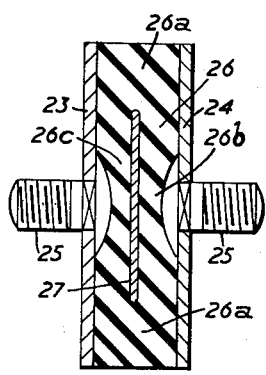
FIGURE 16 is a cross section of a further construction according to the invention.
Figure 17:
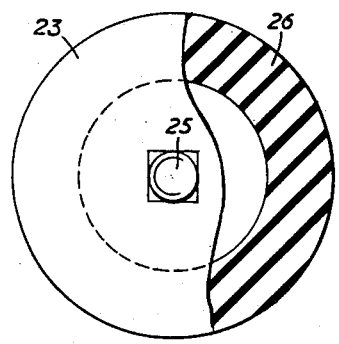

In the construction shown in FIGURES 16 and 17 the mounting comprises rigid members 23 and 24 for connection by pins 25 to the parts to be connected by the mounting and a resilient connection comprising a rubber element 26 bonded to the members 23 and 24 and comprising end parts 26a which are solid and intermediate parts 26b, 26c which are separated by and capable of sliding on a plate 27 of lubricated metal or self-lubricating material.

Figure 18:
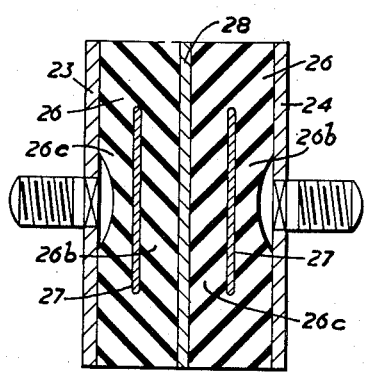
FIGURES 18 and 19 show sectioned modifications of the construction shown in FIGURES 16 and 17.
Figure 19:
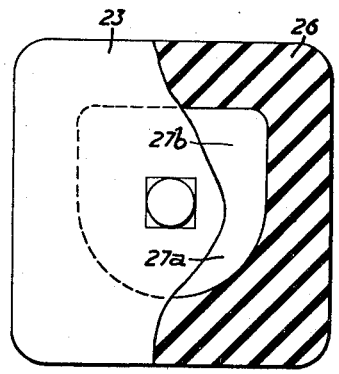

In the modification shown in FIGURE 18 there are two rubber elements 26 similar to that in FIGURE 16 separated by and bonded to an intermediate plate 28 and each associated with a plate 27 relatively to which their parts 26b, 26c can slide. In the modification shown in FIGURE 19 the members 23 and 24 and the element 26 are square instead of circular and the plate 27 is either of circular or square form as indicated respectively at 27a and 27b.

What I claim as my invention and desire to secure by Letters Patent is:

1. A flexible mounting comprising a rigid outer tubular member having an approximately cylindrical bore, a rigid inner member having an approximately cylindrical outer surface, lying within and approximately coaxially with the bore of the outer member and having an external diameter substantially less than the diameter of the bore of the outer member, and resilient connecting means formed of rubber-like flexible resilient material disposed in the space between the inner and outer members and comprising two axially spaced annular end parts each extending between and adhering firmly to the inner and outer members, and two intermediate approximately cylindrical parts arranged approximately coaxially one within the other and disposed in the space between such annular end parts and adhering respectively to the inner and outer members while being substantially free to slide axially over one another, the inner surface of the outer member and the outer surface of the inner member being of non-circular cross section, so that the intermediate parts formed of rubber-like material act to resist relative rotational movement of the inner and outer members about the axis of the mounting at least partly by reason of compression forces produced in the rubber by such relative rotational movement.

2. A flexible mounting comprising two spaced rigid members for attachment to parts which are to be connected by the mounting and resilient connecting means disposed in the space between the two rigid members and serving to connect them to one another, said resilient connecting means being formed of rubber-like flexible material and comprising end parts each extending between and adhering firmly to the two rigid members, and intermediate parts which extend between the end parts, said intermediate parts having overlapping inwardly facing surfaces between which a lubricant is provided, said overlapping surfaces being free to slide over one another in a direction approximately parallel to the surfaces of said rigid members, and each of said intermediate parts having an outwardly facing surface which adheres to one of said rigid members.

3. A flexible mounting as claimed in claim 2, in which the intermediate parts are formed integral with the end parts.

4. A flexible mounting as claimed in claim 3, in which one of the end parts is formed integral with one of the intermediate parts and the other end part is formed integral with the other of the intermediate parts.

5. A flexible mounting as claimed in claim 3 in which a layer of self-lubricating material is provided between the overlapping inwardly facing surfaces of the intermediate parts and this layer is in the form of a self-lubricating material totally enclosed, as by moulding, within the unit constituted by the end parts and the intermediate parts.

6. A flexible mounting comprising two spaced rigid members for attachment to parts which are to be connected by the mounting and resilient connecting means disposed in the space between the two rigid members and serving to connect them to one another, said resilient connecting means comprising edge parts formed of rubber-like flexible resilient material each extending between and adhering firmly to the two rigid members, and intermediate parts which extend between the edge parts, said intermediate parts having overlapping inwardly facing surfaces between which a lubricant is provided, said overlapping surfaces being free to slide over one another in a direction approximately parallel to the surfaces of said rigid members, and each of said intermediate parts having an outwardly facing surface which adheres to one of said rigid members.

References Cited in the file of this patent

UNITED STATES PATENTS

| | | |
|---|---|---|
| 2,051,864 | Knox et al. | Aug. 25, 1936 |
| 2,428,932 | Fawick | Oct. 14, 1947 |
| 2,460,292 | Ivanovic | Feb. 1, 1949 |
| 2,493,172 | Tuck et al. | Jan. 3, 1950 |
| 2,621,923 | Krotz | Dec. 16, 1952 |
| 2,724,770 | Onksen | Nov. 22, 1955 |
| 2,858,150 | Neher et al. | Oct. 28, 1958 |
| 2,940,785 | Haushalter | June 14, 1960 |